(12) United States Patent
Palazzolo

(10) Patent No.: US 8,936,461 B2
(45) Date of Patent: Jan. 20, 2015

(54) TRANSFER DEVICE AND METHOD OF USING

(71) Applicant: Dominic Palazzolo, Cincinnati, OH (US)

(72) Inventor: Dominic Palazzolo, Cincinnati, OH (US)

( * ) Notice: Subject to any disclaimer, the term of this patent is extended or adjusted under 35 U.S.C. 154(b) by 0 days.

(21) Appl. No.: 14/212,453

(22) Filed: Mar. 14, 2014

(65) Prior Publication Data

US 2014/0265005 A1 Sep. 18, 2014

Related U.S. Application Data

(63) Continuation-in-part of application No. 13/831,346, filed on Mar. 14, 2013.

(51) Int. Cl.
*B23B 9/00* (2006.01)
*B26D 9/00* (2006.01)
*A21C 11/10* (2006.01)

(52) U.S. Cl.
CPC .. *B26D 9/00* (2013.01); *A21C 11/10* (2013.01)
USPC .................... 425/298; 425/299; 425/436 RM

(58) Field of Classification Search
USPC ............. 425/292, 298, 299, 118, 281, 318, 2,
425/301, 306, 82, 220, 436 RM; 30/316;
264/313, 334, 339; 156/245, 297
See application file for complete search history.

(56) References Cited

U.S. PATENT DOCUMENTS

| | | | |
|---|---|---|---|
| 1,874,511 A | 8/1932 | Habermaas | |
| 2,008,725 A | 7/1935 | Parker | |
| 2,214,475 A * | 9/1940 | Napolillo | 425/182 |
| 2,239,766 A * | 4/1941 | Zabel | 425/299 |
| 2,493,854 A | 1/1950 | Brainard | |
| 2,596,159 A | 5/1952 | Mcbirney | |
| 2,734,465 A * | 2/1956 | Head | 426/502 |
| 2,797,653 A | 7/1957 | Rade | |
| 2,820,423 A | 1/1958 | Catuccio | |
| 2,838,791 A * | 6/1958 | Theis | 425/2 |
| 2,876,714 A * | 3/1959 | Brown | 30/316 |
| 2,997,788 A | 8/1961 | Gilbert | |
| 3,025,206 A * | 3/1962 | Scholl | 156/219 |
| 3,053,203 A * | 9/1962 | Gaddini | 425/299 |
| 3,061,500 A * | 10/1962 | Kreier, Jr. | 156/245 |
| 3,629,035 A * | 12/1971 | Kuroda | 156/219 |
| 3,680,828 A | 8/1972 | Swett | |
| 3,754,327 A * | 8/1973 | Lisa | 30/316 |
| 3,799,493 A | 3/1974 | Beck et al. | |

(Continued)

OTHER PUBLICATIONS

Marvelous Molds, 5 pages; Jun. 30, 2013.*

(Continued)

*Primary Examiner* — Linda L Gray
(74) *Attorney, Agent, or Firm* — Steve Witters; Witters & Associates

(57) ABSTRACT

A design transfer device comprising an elastic planar wall having a first side surface and a second side surface is disclosed herein. An elastic cutting blade is unitary with the elastic planar wall and extends directly from the first side surface of the elastic planar wall. The elastic cutting blade is continuous and is configured to cut a design from a moldable material. The elastic cutting blade has an inner side surface and an outer side surface with a cutting edge therebetween. The cutting edge is disposed at a substantially constant distance, from the first side surface of the elastic planar wall, throughout its perimeter. A method of using the design transfer device is also disclosed herein.

11 Claims, 14 Drawing Sheets

(56) References Cited

U.S. PATENT DOCUMENTS

| | | | | |
|---|---|---|---|---|
| 3,921,801 | A | 11/1975 | Sway | |
| 3,966,165 | A * | 6/1976 | Psensky | 249/120 |
| 4,057,874 | A * | 11/1977 | Walker, Jr. | 425/318 |
| 4,076,207 | A | 2/1978 | Austin | |
| 4,156,516 | A | 5/1979 | Oliver | |
| 4,195,402 | A * | 4/1980 | Leffer | 30/114 |
| 4,200,658 | A | 4/1980 | Katzman et al. | |
| 4,327,489 | A | 5/1982 | Conrad | |
| 4,384,838 | A | 5/1983 | Laughlin | |
| 4,769,188 | A * | 9/1988 | Graham et al. | 264/51 |
| 4,818,207 | A * | 4/1989 | Heron | 425/289 |
| 4,836,396 | A * | 6/1989 | Ancona et al. | 220/212 |
| 4,848,104 | A | 7/1989 | Plath | |
| 5,789,009 | A | 8/1998 | Kordic et al. | |
| 5,861,185 | A | 1/1999 | Capodieci | |
| 5,871,783 | A | 2/1999 | Capodieci | |
| 5,954,561 | A | 9/1999 | Cannone | |
| 6,210,720 | B1 | 4/2001 | Leusner et al. | |
| 6,231,330 | B1 | 5/2001 | Capodieci | |
| 6,431,849 | B1 | 8/2002 | Capodieci | |
| 6,521,279 | B2 * | 2/2003 | Lachnit | 426/496 |
| 6,530,767 | B1 | 3/2003 | Capodieci | |
| 6,607,765 | B2 | 8/2003 | Capodieci | |
| 6,627,239 | B1 | 9/2003 | Gavie et al. | |
| 6,797,223 | B2 | 9/2004 | Beale et al. | |
| 6,830,769 | B2 | 12/2004 | Meroni | |
| 6,902,754 | B1 * | 6/2005 | Evans et al. | 426/503 |
| 7,288,013 | B2 * | 10/2007 | Yokoyama et al. | 445/23 |
| 7,331,776 | B2 | 2/2008 | Errera | |
| 7,517,933 | B2 | 4/2009 | Holmes et al. | |
| 8,458,814 | B1 * | 6/2013 | Voto | 2/160 |
| D712,707 | S * | 9/2014 | Altounian | D7/675 |
| 2001/0043977 | A1 | 11/2001 | Hompanera et al. | |
| 2003/0003207 | A1 | 1/2003 | Capodieci | |
| 2004/0040443 | A1 * | 3/2004 | Errera | 99/388 |
| 2005/0132579 | A1 | 6/2005 | Sartori | |
| 2005/0153023 | A1 | 7/2005 | Overton | |
| 2005/0189084 | A1 | 9/2005 | Bitton | |
| 2005/0206034 | A1 * | 9/2005 | Yokoyama et al. | 264/219 |
| 2006/0040026 | A1 | 2/2006 | Herbert | |
| 2006/0272461 | A1 | 12/2006 | Atwater et al. | |
| 2008/0241326 | A1 | 10/2008 | Ekberg | |
| 2009/0255413 | A1 | 10/2009 | Ewald et al. | |
| 2010/0227024 | A1 * | 9/2010 | Flores | 426/87 |
| 2012/0231105 | A1 | 9/2012 | Palazzolo | |

OTHER PUBLICATIONS

Fondant ejector cutters, 2 pages; Aug. 10, 2012.*
Stretchy Cutters, 3 pages; Sep. 6, 2012.*

* cited by examiner

TRANSFER DEVICE AND METHOD OF USING

CROSS REFERENCE TO RELATED APPLICATIONS

This application claims the benefit of priority to and is a continuation-in-part of U.S. application Ser. No. 13/831,346 (filed Mar. 14, 2013), the entire contents of which is herein incorporated by reference.

FIELD OF THE DISCLOSURE

This disclosure relates generally to design transfer devices configured to cut a design from moldable materials.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Cutters configured to cut moldable materials, such as clay and dough, have been and are currently used in a large variety of applications. For example, cookie cutters have been used for many years to form an outer perimeter shape of cookie dough prior to baking. Molds have also been used for shaping surfaces of materials into desired shapes. For example, the use of molds with an embossed pattern on a wall of a mold cavity is common in shaping moldable materials, such as clay and confectionery compounds such as rolled fondant, modeling chocolate and gum paste. However, apparatuses configured to cut moldable material may have sharp cutting blades, creating health and safety concerns. For example, human skin may be punctured or lacerated from a slicing or entrapment of fingers and parts of the hand while using known apparatuses configured to cut moldable material. Additionally, apparatuses configured for cutting and molding moldable materials are typically separate apparatuses or require an apparatus to have multiple component parts. This may increase labor costs associated with usage, cleaning, and maintenance of the apparatus(es). Further, molds and cutters currently in use may not allow easy transfer of material therefrom. For example, current cutters or molds having a complex perimeter shape of a cutter and/or detail in an embossing pattern in a mold may cause a mold or cutter to capture material within the cutter and/or embossed surface of a mold.

SUMMARY

In one aspect of the present disclosure, a design transfer device is provided. The design transfer device comprises an elastic planar wall having a first side surface and a second side surface. An elastic cutting blade is unitary with the elastic planar wall and extends directly from the first side surface of the elastic planar wall. The elastic cutting blade is configured to cut a design from a moldable material and maintain a substantially consistent perimeter upon cutting. The elastic cutting blade has an inner side surface and an outer side surface with a cutting edge therebetween. The cutting edge is disposed at a substantially constant distance throughout its perimeter, from the first side surface of the elastic planar wall. The inner side surface of the elastic cutting blade extends non-perpendicularly from the first side surface of the elastic planar wall to the cutting edge, throughout the entire perimeter of the cutting blade.

In another aspect of the present disclosure, a method of transferring a design of moldable material using the design transfer device is provided. The method comprises the steps of rolling a moldable material into a sheet and placing the sheet of moldable material onto the design transfer device and completely covering the entire inner perimeter of the cutting edge. Cutting out a portion of the sheet of moldable material by pressing the sheet of moldable material against the cutting edge and maintaining a substantially consistent perimeter of the cutting edge. The cutting may be realized by placing the sheet of moldable material on the design transfer device and rolling, with a rolling pin, the moldable material. Removing cut moldable material from an exterior perimeter of the cutting edge and holding at least a portion of the cut moldable material disposed within an interior perimeter of the cutting edge. Finally, transferring, by hand, at least a portion of the held molded material directly from the design transfer device onto a surface configured to receive the cut molded material.

In a further aspect of the present disclosure, a method of making and transferring a design of moldable material onto a surface configured to receive cut molded material is provided. The method comprising the steps of: rolling a moldable material into a sheet; placing the sheet of moldable material onto a design transfer device and completely covering the entire inner perimeter of a cutting edge; pressing the sheet of moldable material against the cutting edge and maintaining a substantially consistent perimeter of the cutting edge; cutting out a portion of the sheet of moldable material; removing cut moldable material from an exterior perimeter of the cutting edge; holding at least a portion of the cut molded material disposed within an interior perimeter of the cutting edge; and transferring, by hand, at least a portion of the held molded material directly from the design transfer device onto the surface configured to receive the cut molded material.

In yet another aspect of the present disclosure, a design transfer device comprises an elastic planar wall having a first side surface and a second side surface, an elastic cutting blade unitary with the first side surface of the elastic planar wall and configured to cut moldable material, the elastic cutting blade having a continuous cutting edge disposed at a substantially consistent distance from the first side surface of the elastic planar wall, throughout an entire perimeter of the cutting blade, and the design transfer device being configured for aligning the elastic cutting blade with at least one feature on a surface configured to receive the cut moldable material.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

DETAILED DESCRIPTION

Reference will now be made in detail to the present exemplary embodiments and aspects of the present invention, examples of which are illustrated in the accompanying figures. Aspects of the present disclosure may provide a single unitary design transfer device configured to cut and optionally mold moldable material and release the cut material therefrom. In at least one aspect, cut molded material may be transferred directly from the design transfer device onto a surface configured to receive the cut moldable material.

Moldable materials may be non-edible or edible. For example, clay, fondant, gumpaste, modeling chocolate, pastillage, cookie dough, and other confectionary compositions and craft moldable compounds may be cut to have a desired shape or design, in a single process step, with the presently disclosed design transfer device configured to cut the moldable material. Aspects of the present disclosure may be advantageously configured to cut, shape, or form sheetable materials such as rolled fondant or clay.

Figure 1:
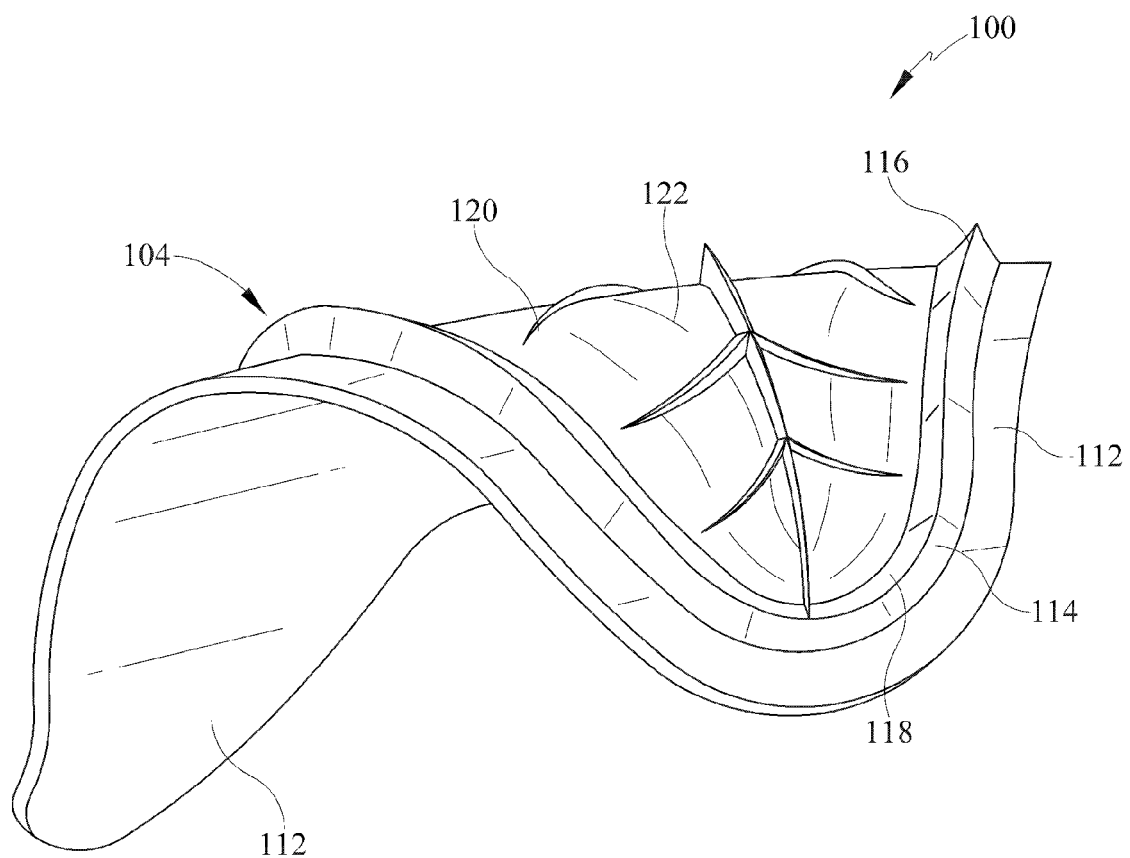
FIG. 1 is a perspective view of a design transfer device of the present disclosure showing the disposition of features thereof.

FIG. 1 shows unitary elastic design transfer device 100 and the disposition of features thereof. Design transfer device 100 is unitary in construction and may be comprised of common materials throughout. The material or materials making up design transfer device 100 may be stretchable, flexible, elastic, or have other and additional properties. For example, design transfer device 100 may comprise polymeric materials, rubber, and/or silicone. In at least one embodiment, design transfer device 100 may comprise a translucent material and be configured for aligning a portion thereof with at least one feature on a surface configured to receive the cut moldable material.

Design transfer device 100 may comprise an elastic planar wall 112 having a first side surface and a second side surface. An elastic cutting blade 104 is unitary with elastic planar wall 112 and extends directly from the first side surface of elastic planar wall 112. Elastic cutting blade 104 is continuous and is configured to cut a design from a moldable material. Elastic cutting blade 104 has an inner side surface 118 and an outer side surface 114 with a cutting edge 116 therebetween. Cutting edge 116 is disposed at a substantially constant distance throughout its perimeter from the first side surface of elastic planar wall 112. In at least one embodiment, inner side surface 118 of elastic cutting blade 104 extends non-perpendicularly from the first side surface of elastic planar wall 112 to cutting edge 116, throughout the entire perimeter of cutting blade 104. In at least one other embodiment, elastic planar wall 112 has at least a portion extending outside of a perimeter of elastic cutting blade 104.

In at least one embodiment, design transfer device 100 is configured for aligning elastic cutting blade 104 with at least one feature on a surface configured to receive the cut moldable material. For example, portions of design transfer device 100 may comprise a translucent material or other material configured to permit seeing through at least a portion thereof to see a feature on the surface to receive cut moldable material from design transfer device 100.

Design transfer device 100 may be configured to hold cut moldable material within the perimeter of cutting blade 104 and release the cut moldable material onto a surface configured to receive the cut moldable material. In at least one embodiment, a cut design may be transferred directly from design transfer device 100 onto a surface configured to receive the cut design. Design transfer device 100 may be configured to have a low adherence to cut moldable material. For example, an adherent property between the cut moldable material and the surface receiving the cut design may be greater than an adherent property between the cut moldable material and design transfer device 100. Alternatively or additionally, design transfer device 100 may comprise a material configured for the release of cut material therefrom by bending or stretching by hand. For example, design transfer device 100 may have a portion of elastic planar wall 112 extending outwardly beyond outer side surface 114 of elastic cutting blade 104. Design transfer device 100 may have an elasticity sufficient to release cut material therefrom by hand stretching wherein inner cutting blade surface 118 is stretched by an amount sufficient to release the cut material therefrom.

Design transfer device 100 may comprise one or more features, contours, or embossments in the first side surface of elastic planar wall 112, within the perimeter of elastic cutting blade 104. For example, design transfer device 100 may have cutting blade 104 configured to cut a leaf design from moldable material. Contours 119, 120, and 122 may be disposed within the perimeter of cutting blade 104 and configured to impart impressions, features, or designs within a cut edge of molded material. For example, contours 120 may extend from a cutting edge of a contour 119, and may taper into planar wall 112. Contours 119 and 120 may impart a stem and veins in a leaf design of material cut and molded with design transfer device 100. Design transfer device 100 may comprise additional or other features, contours, or embossments in the first side surface of elastic planar wall 112, within the perimeter of elastic cutting blade 104, configured to impart other contours or other aesthetic features into the moldable material being cut with design transfer device 100.

Elastic cutting blade 104 may have a wedge shaped, rounded shape, and/or other shape configured to cut moldable material. Cutting blade 104 may comprise a cutting edge 116, an inner cutting blade surface 118 and an outer cutting blade surface 114. Cutting blade surfaces 114 and 116 may extend from cutting edge 116 to the first side surface of planar wall 112. Cutting edge 116 may be rounded or pointed. Inner cutting blade surface 118 and outer cutting blade surface 114 may be planar or curved. In at least one embodiment, inner side surface 118 of elastic cutting blade 104 extends non-perpendicularly from the first side surface of elastic planar wall 112 to cutting edge 116, throughout the entire perimeter of cutting blade 104.

In at least one embodiment, design transfer device 100 has at least a portion of planar wall 112 extending outwardly beyond an outer perimeter of outer cutting blade surface 114. This outward extension of planar wall may be substantially equidistant throughout its perimeter as shown with mold and cutter combination 100. However, it is to be understood that an extension of planar wall 112 beyond an outer perimeter of cutting blade 104 is optional and may have portions with a greater extension, lesser extension, or no extension. For example, portions of planar wall 112 may extend beyond outer cutting blade surface 114 to form tabs. Portions of planar wall 112 extending beyond outer cutting blade surface 114 may increase the ability to grasp and to stretch portions of design transfer device for the transfer or removal of cut molded material therefrom.

Figure 2:
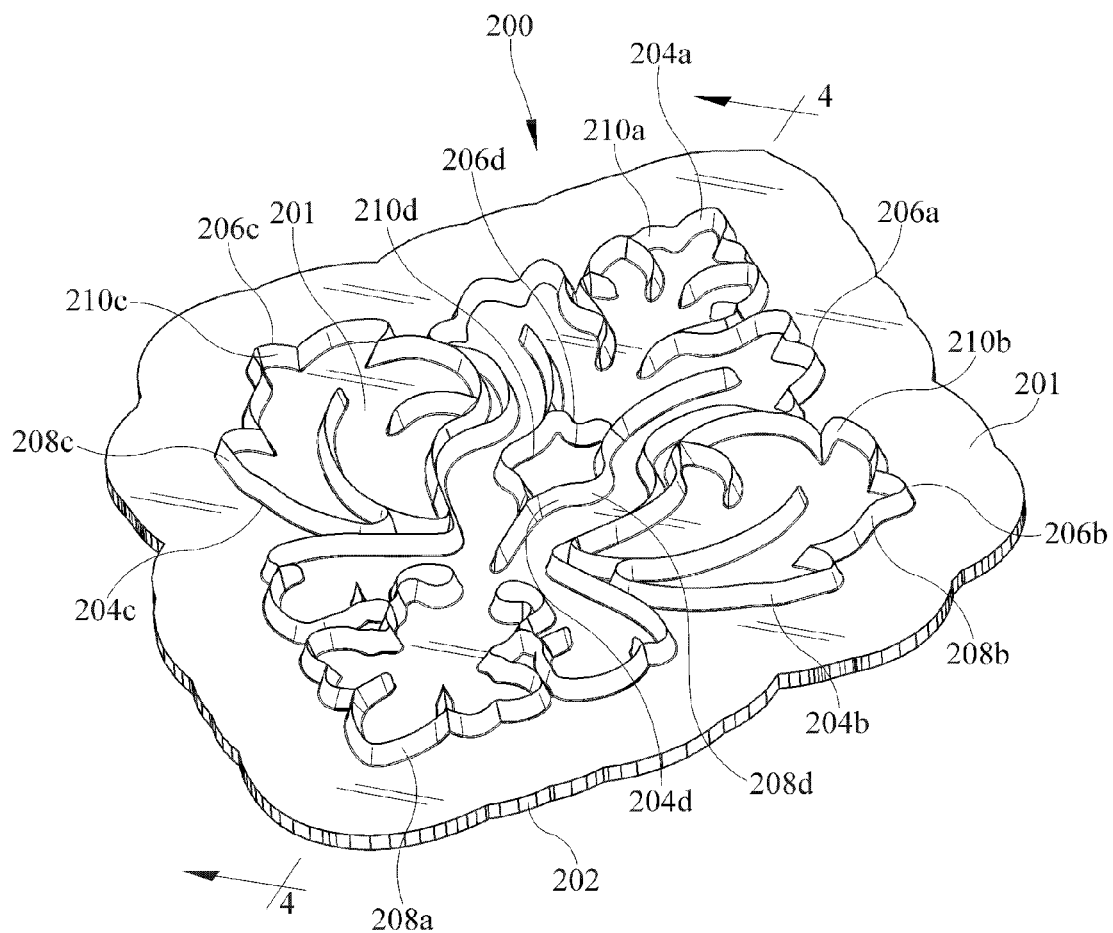
FIG. 2 is a perspective view of a design transfer device of the present disclosure having a plurality of cutting blades.

FIG. 2 shows design transfer device 200 having a plurality of cutting blades. The design transfer device of the present disclosure may comprise a plurality of continuous cutting blades configured to cut moldable material into one or more designs. In at least one embodiment, the design transfer device of the present disclosure may be configured to cut a plurality of designs from a moldable material wherein the designs may or may not be related. For example, a single design transfer device may be configured to cut both the leaf design, as shown in FIG. 1, and the damask pattern, as shown in FIG. 2, from a moldable material.

FIG. 2 shows design transfer device 200 configured to cut related designs from a moldable material to form a damask pattern. Design transfer device 200 has continuous elastic cutting blades 204a, 204b, 204c, and 204d extending from a first side surface 201 of elastic planar wall 202. Elastic cutting blade 204a has cutting edge 206a, outer side surface 208a, and inner side surface 210a. Elastic cutting blade 204b has cutting edge 206b, outer side surface 208b, and inner side surface 210b. Elastic cutting blade 204c has cutting edge 206c, outer side surface 208c, and inner side surface 210c. Elastic cutting blade 204d has cutting edge 206d, outer side surface 208d, and inner side surface 210d.

Figure 3:
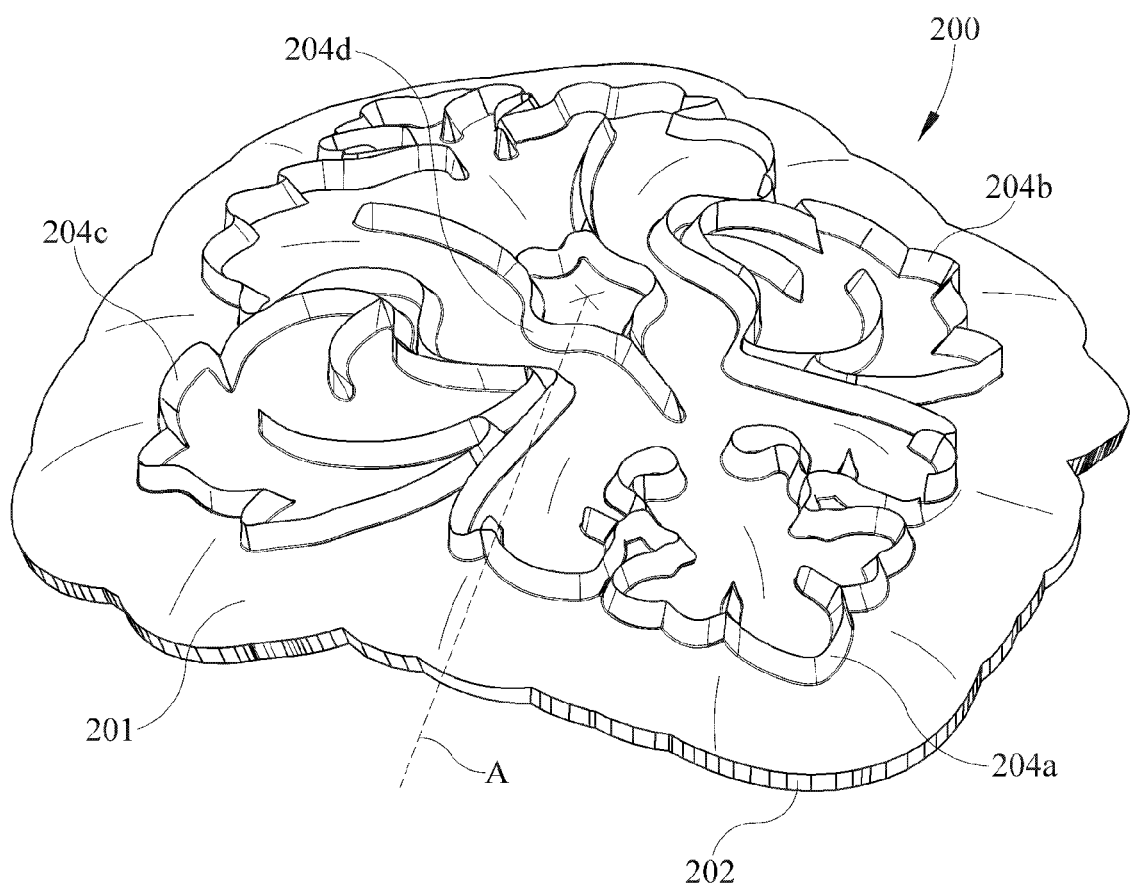
FIG. 3 is a perspective view of the design transfer device of FIG. 2 showing at least one physical attribute.

FIG. 3 shows design transfer device 200 being bent about a central point of a rear side or second side surface thereof. In at least one embodiment, the design transfer device of the present disclosure has an elasticity sufficient to be spherically bent with the application of opposing forces on elastic planar wall 202. For example, a designer may hold outer portions of elastic planar wall 202 and simultaneously push on a central portion, axis A, of the rear or second side surface of elastic planar wall 202. The spherical bending of elastic planar wall 202, about axis A, may cause the front or first side surface 201 to expand. The expansion of first side surface 201 may in turn cause the expansion of the perimeter of each elastic cutting blade, 204a, 204b, 204c, and 204d. The expansion of cutting blades, 204a, 204b, 204c, and 204d may aid in the release of cut moldable material, before or during the transfer of cut moldable material from design transfer device 200 to a surface configured to receive the cut moldable material.

Figure 4:
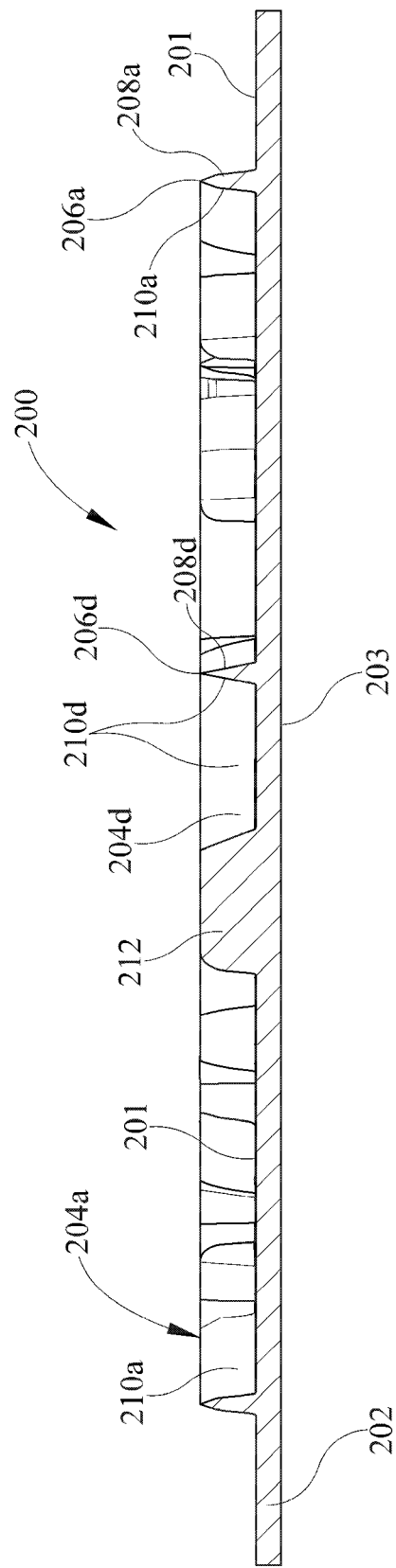
FIG. 4 is a cross-sectional view of the design transfer device of FIG. 2.

FIG. 4 shows a cross-sectional view of design transfer device 200 taken along section line 4 of FIG. 2. Design transfer device 200 has an elastic planar wall 202 having a first side surface 201 and a second side surface 203. Elastic cutting blades 204a and 204d are shown in this cross section and are unitary with elastic planar wall 202 and extend directly from first side surface 201. Cutting blades 204a and 204d are both continuous and configured to cut a design from a moldable material, as more clearly shown in FIGS. 2 and 3. Elastic cutting blades 204a and 204d have inner side surfaces 210a and 210d and outer side surfaces 208a and 208d with a cutting edge 206a and 206d therebetween. Cutting edges 206a and 206d are disposed at a substantially constant distance throughout their perimeters from first side surface 201 of elastic planar wall 202. Inner side surfaces 210a and 210d of elastic cutting blades 204a and 204d extend non-perpendicularly from first side surface 201 of elastic planar wall 202 to cutting edges 206a and 206d, throughout their entire perimeters. Inner side surface 210a angularly extends from first side surface, with two linear portions with different slopes, from first side surface 201 to cutting edge 206a. Inner side surface 210d linearly extends from first side surface 201 to cutting edge 206d. Contour 212 extends from cutting blade 204d and is configured to impart an aesthetic cut in moldable material.

Figure 5:
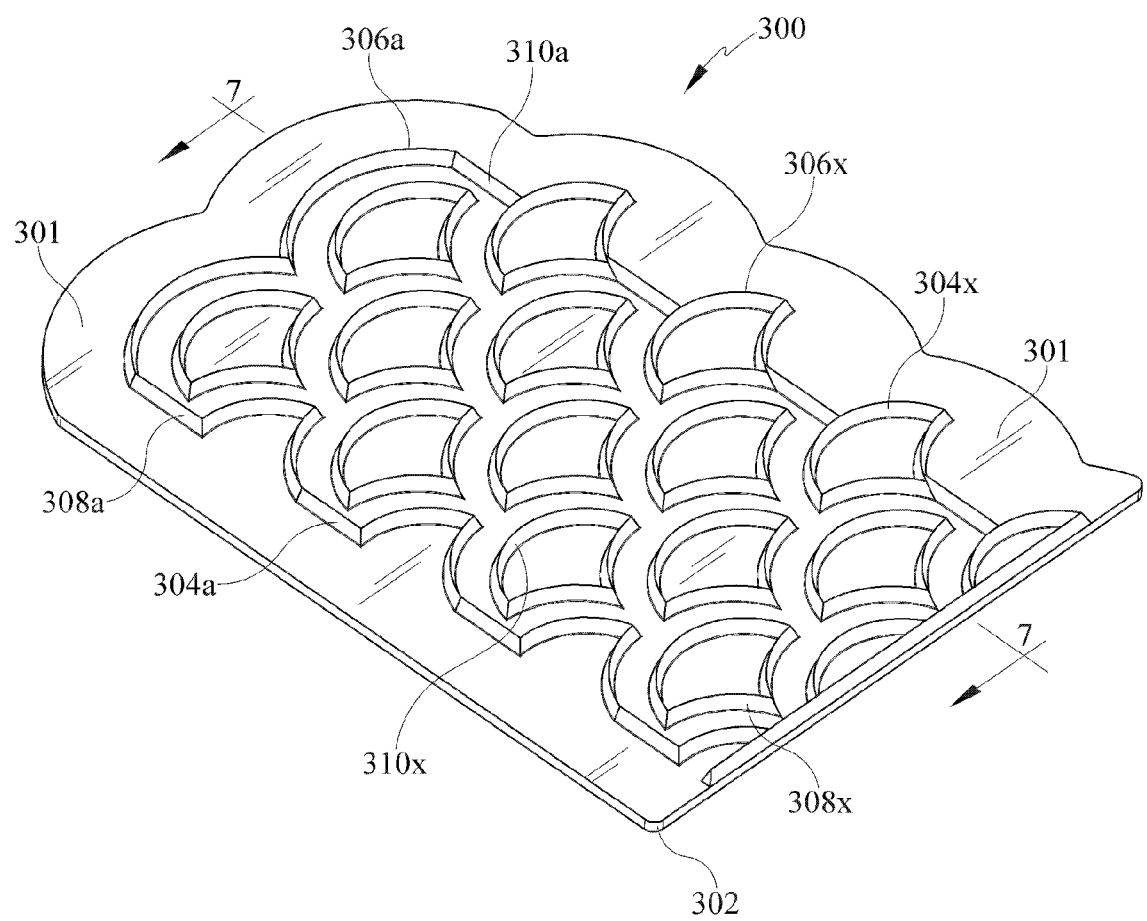
FIG. 5 is a perspective view of a design transfer device of the present disclosure having a plurality of cutting blades.

FIG. 5 shows design transfer device 300 having a plurality of cutting blades. Elastic cutting blades 304a and 304x are unitary with elastic planar wall 302 and extend directly from first side surface 301. Elastic cutting blade 304a has cutting edge 306a, outer side surface 308a, and inner side surface 310a. Elastic cutting blades 304x have cutting edges 306x, outer side surfaces 308x, and inner side surfaces 310x. On one side of design transfer device 300, cutting blades 304a and 304x have portions merged to form a single cutting blade. Cutting blades 304x form a repeating pattern within a perimeter of cutting blade 304a. Elastic planar wall 302 has portions extending outside of a perimeter of the elastic cutting blades on three sides of design transfer device 300. A lower portion of elastic planar wall 302 truncates adjacent the lower cutting blades. The lower edge of elastic planar wall 302 may aid in removing excess moldable material outside of a cut design and/or may aid in aligning moldable material held by design transfer device 300 with at least one feature on the surface configured to receive the held moldable material.

Figure 6:
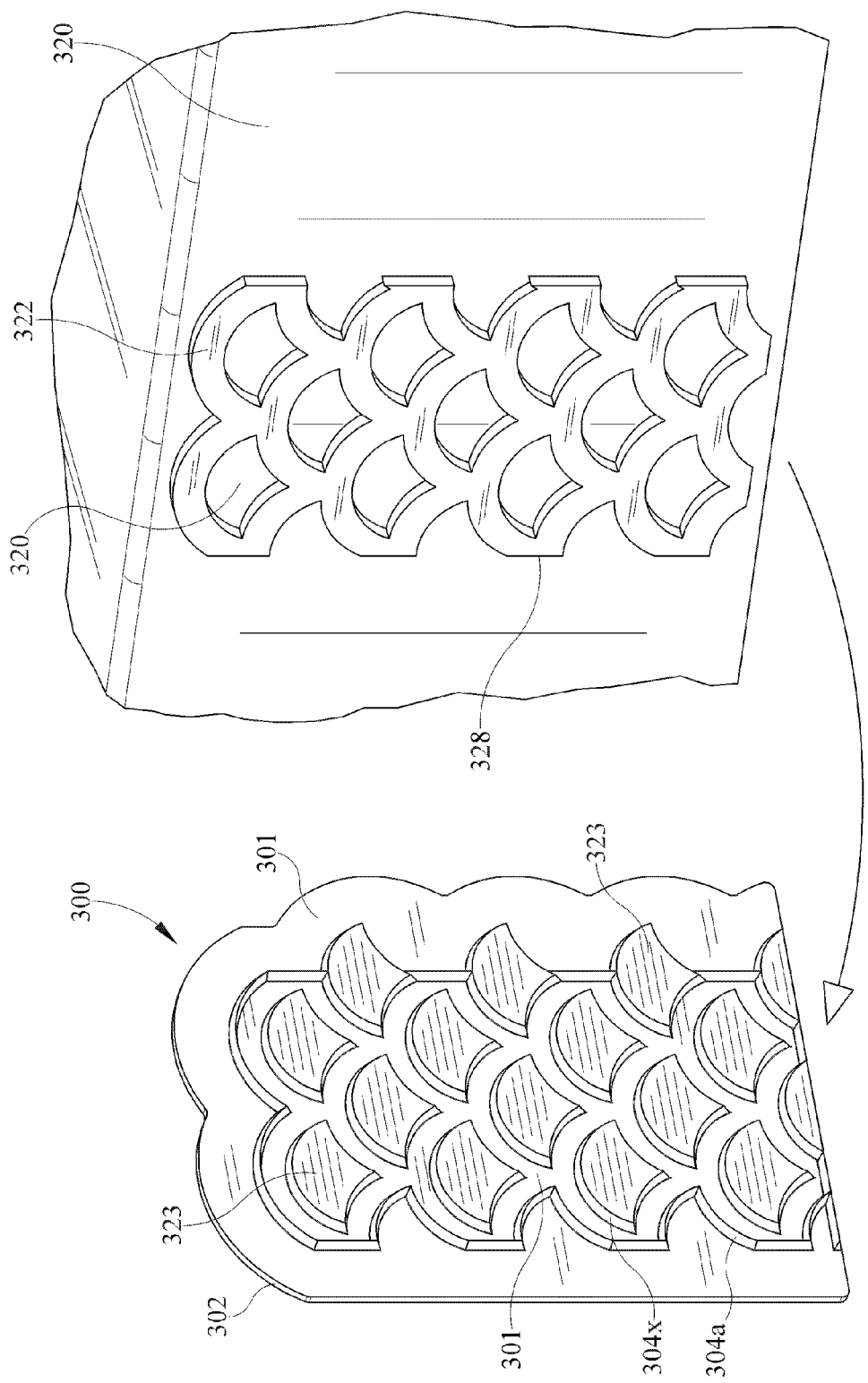
FIG. 6 illustrates a design transfer using the design transfer device of FIG. 5.

FIG. 6 illustrates a design transfer using design transfer device 300 of FIG. 5. A method for transferring a design of moldable material using design transfer 300 may comprise placing a sheet of moldable material about design transfer device 300 to completely cover an entire inner perimeter of the outer cutting blades 304a and 304x. The sheet of moldable material may then be pressed against the cutting edges thereby cutting out a portion of the sheet of moldable material. Any excess moldable material, exterior of a perimeter of the cutting edges, is then removed.

As shown in the FIG. 6, only a portion of the cut moldable material 322 may be transferred onto the surface configured to receive the cut moldable material 320. This partial transfer of cut moldable material may be accomplished several different ways. For example, portions of the cut design of moldable material may be removed from design transfer device 300 prior to transfer. Removal may be accomplished by hand or with a simple hand tool. Alternatively, an adhesive may be placed on the portions of the cut design of moldable material selected for transfer. In either case, design transfer device 300 may be stretched or bent to loosen the cut moldable material from the cutting blades and first surface 301. FIG. 6 shows where an adhesive was placed on cut moldable material 322 and transferred to surface 320 and moldable material 323 was held in design transfer device 300. The lower edge of elastic planar wall 302 aided in aligning moldable material held by design transfer device 300 with a lower edge of surface 320.

Transfer of moldable material 322 onto surface 320 may be made by gently placing design transfer device 300 having the cut moldable material held therewith, against surface 320.

Figure 7:
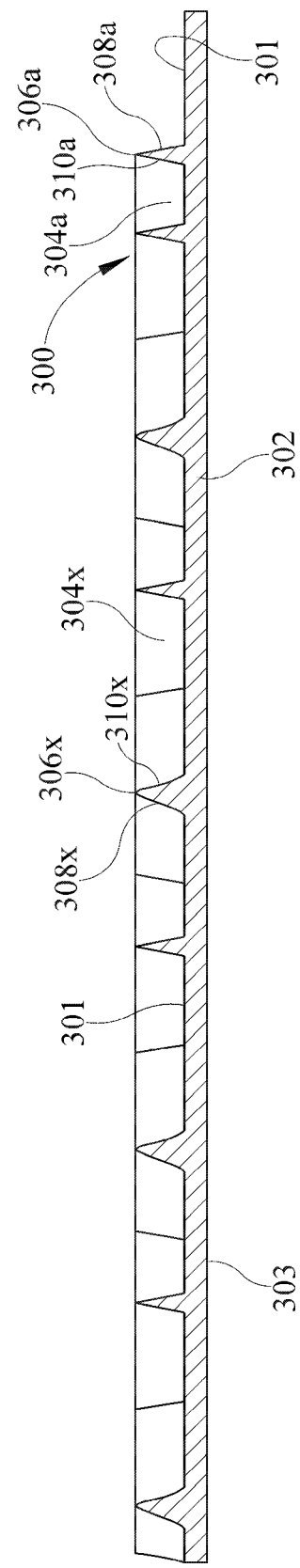
FIG. 7 is a cross-sectional view of the design transfer device of FIG. 6.

FIG. 7 shows a cross-sectional view of design transfer device 300 taken along section line 7 of FIG. 5. Design transfer device 300 has an elastic planar wall 302 having a first side surface 301 and a second side surface 303. Elastic cutting blades 304a and 304x are shown in this cross section and are unitary with elastic planar wall 302 and extend directly from first side surface 301. Cutting blades 304x are continuous and configured to cut a design from a moldable material, as shown in FIG. 6. Elastic cutting blades 304a and 304x have inner side surfaces 310a and 310x and outer side surfaces 308a and 308x with a cutting edge 306a and 306x therebetween. Cutting edges 306a and 306x are disposed at a substantially constant distance throughout their perimeters from first side surface 301 of elastic planar wall 302. However, it is to be understood that cutting edges 306a and 306x may not be disposed the same distance from first side surface 301 of elastic planar wall 302.

Inner side surfaces 310a and 310x of elastic cutting blades 304a and 304x extend non-perpendicularly from first side surface 301 of elastic planar wall 302 to cutting edges 306a and 306x, throughout their entire perimeters. Inner side surfaces 310a and 310x linearly extend from first side surface 301 to cutting edges 306a and 306x, respectively.

The height of cutting blades 304a and 304x, distance of cutting edges 306a and 306x from first surface 301, may be dependent upon the rigidity of design transfer device 300 and the firmness, stability, or resistance to cutting of the moldable material. The height of cutting blades 304a and 304x may be dependent upon additional or other parameters such as the physical attributes of the moldable material and aesthetic use of such material when applied to a surface. In an example where the moldable material is fondant and gum-paste a blade height of about 0.062" may provide a thickness that looks good and complies with professional standards when transferring the moldable material to a cake. However, it is to be understood that the design transfer device of the present disclosure may comprise most any blade height depending upon physical attributes of the design transfer device and the physical attributes of the moldable material to be cut. It may be advantageous to have a blade height less than 0.25", less than 0.1", or less, in increments of 0.001". In at least one embodiment, it may be advantageous to have a blade height greater than 0.25", in increments of 0.001". For example, it may be advantageous to have a blade of height of an inch or more.

Similarly, the thickness of cutting blades 304a and 304x, adjacent first side surface 301, may be dependent upon the rigidity of design transfer device 300 and the firmness, stability, or resistance to cutting of the moldable material. In an example where the moldable material is fondant and gum-paste and the blade height is about 0.062", a thickness of about 0.055" may provide a cut that looks good and complies with professional standards when transferring the moldable material to a cake. However, it is to be understood that the design transfer device of the present disclosure may comprise most any blade thickness depending upon physical attributes of the design transfer device and the physical attributes of the moldable material to be cut. It may be advantageous to have a blade thickness less than 0.25", less than 0.1", or less, in increments of 0.001". Also, a thicker blade be desirable. For example, it may be advantageous to have a blade thickness greater than 0.25", in increments of 0.001", up to an inch or even thicker.

Figure 8:
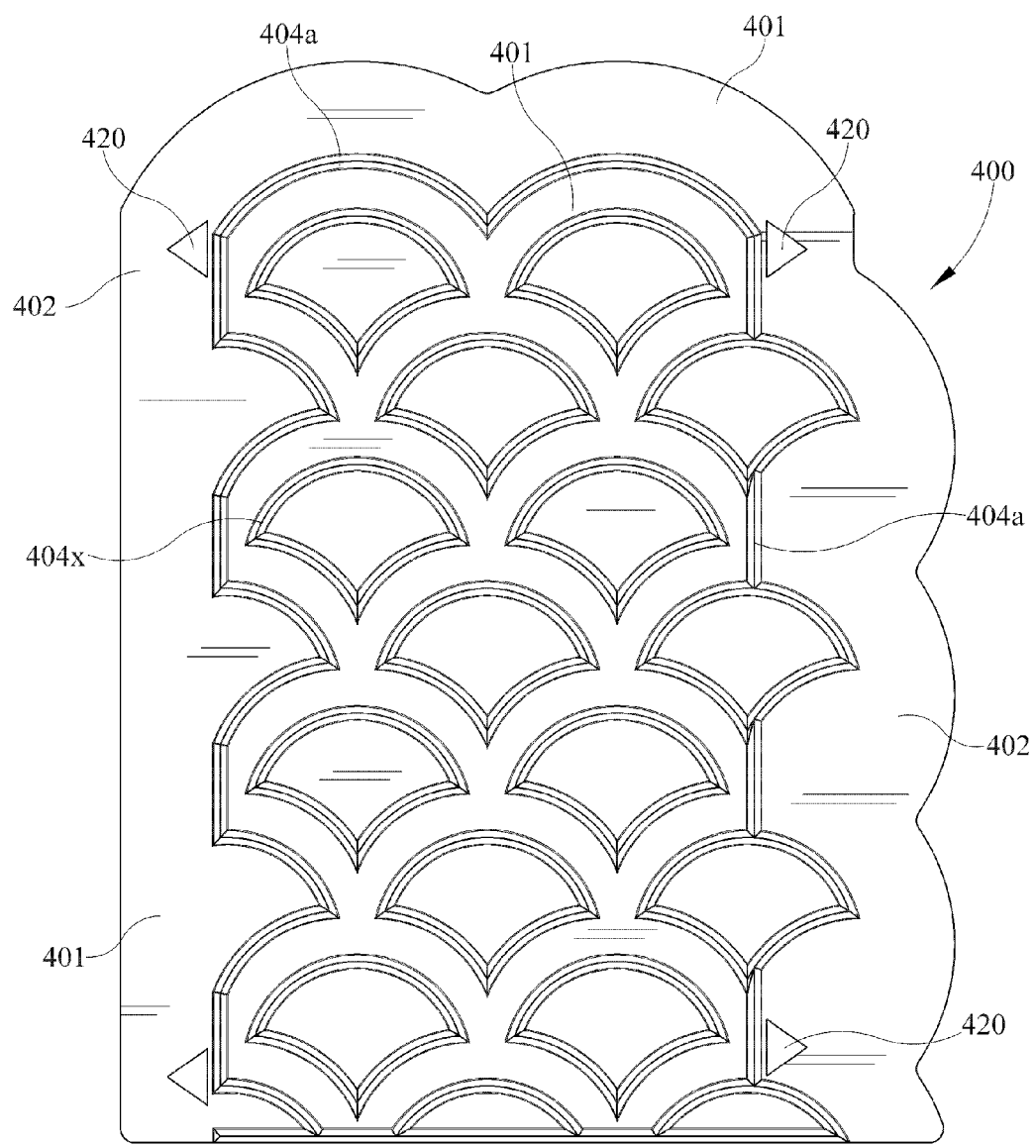
FIG. 8 is a front view of a design transfer device of the present disclosure configured for aligning an elastic cutting blade with at least one feature on a surface configured to receive cut moldable material.

FIG. 8 shows design transfer device 400 having a plurality of cutting blades. Elastic cutting blades 404a and 404x are unitary with elastic planar wall 402 and extend directly from first side surface 401. Elastic planar wall 402 has portions extending outside of a perimeter of the elastic cutting blades on three sides of design transfer device 400.

A lower portion of elastic planar wall 402 truncates adjacent to the lower cutting blades. The lower edge of elastic planar wall 402 may aid in removing excess moldable material outside of a cut design and/or may aid in aligning moldable material held by design transfer device 400 with at least one feature on the surface configured to receive the held moldable material. Additionally, design transfer device 400 has view ports 420 configured and disposed to aid in aligning moldable material held by design transfer device 400 with at least one feature on the surface configured to receive held moldable material. It is to be understood that design transfer device 400 may have other and different features or properties to aid in aligning. For example, portions or all of design transfer device 400 may be comprised of a translucent material.

Figure 9:
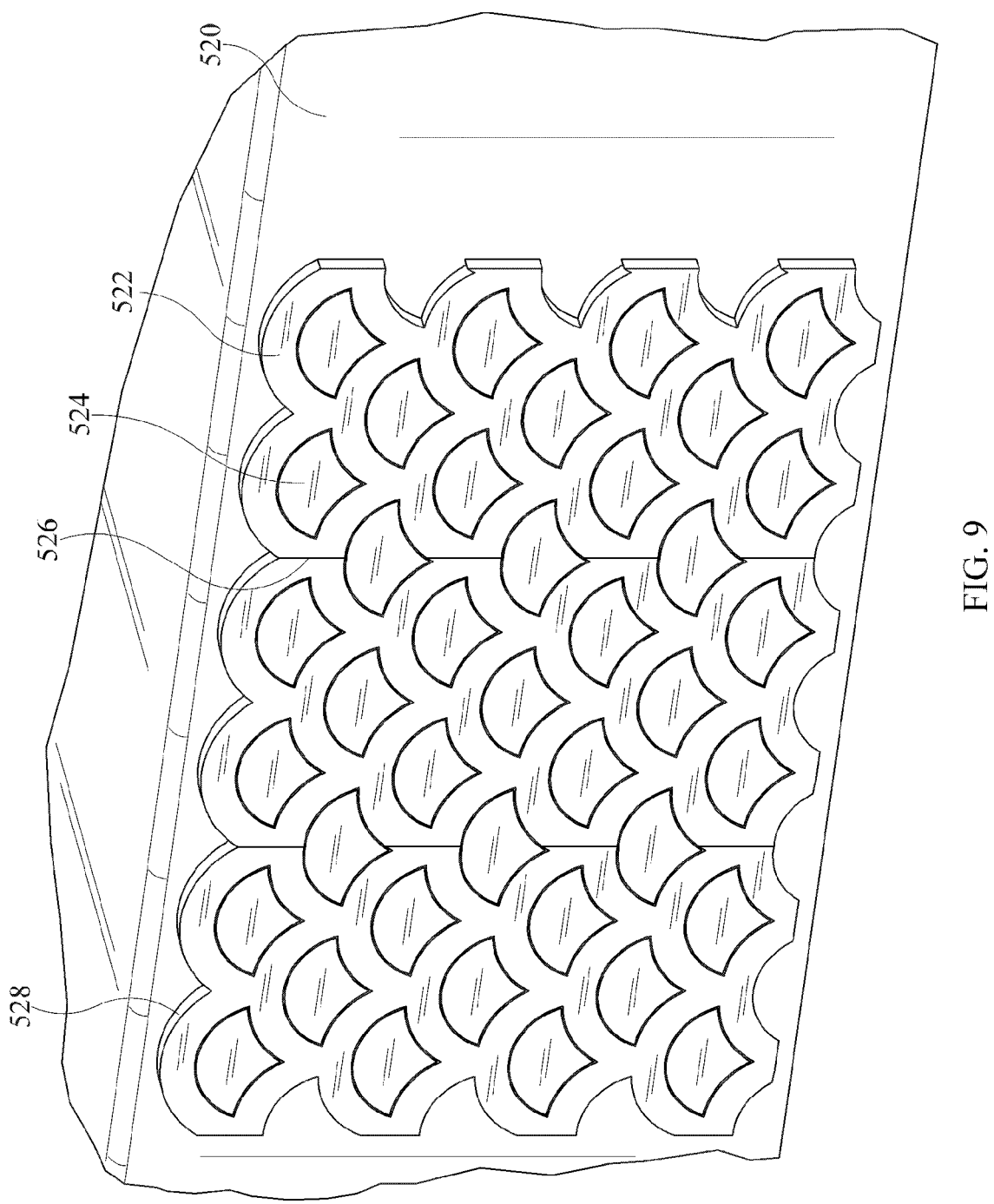
FIG. 9 illustrates transferring and aligning a plurality of designs directly from a design transfer device onto a surface configured to receive the cut moldable material.

FIG. 9 illustrates a design transfer using design transfer device 400 of FIG. 8. A method for transferring a design of moldable material using design transfer 400 may comprise placing a sheet of moldable material about design transfer device 400 to completely cover an entire inner perimeter of the outer cutting blades. The sheet of moldable material may then be pressed against the cutting edges thereby cutting out a portion of the sheet of moldable material. Any excess moldable material, exterior of a perimeter of the outer cutting edges, is then removed. Design transfer device 400 may be stretched or bent to loosen the cut moldable material from the cutting blades and first surface 401.

An adhesive may be placed on cut moldable material 524 and 522 and then transferred to surface 520, as shown in FIG. 9. The adhesive material may not need be applied as cut moldable material 524 and 522 may have a greater affinity for surface 520 than first side surface 401 of design transfer device 400. In this example, all the cut moldable material held with design transfer device 400 is transferred to surface 520. Cutting blades 404x cut through the moldable material to form a design in the form of lines separating cut moldable material 524 and 522, as shown in FIG. 9.

The lower edge of elastic planar wall 402 may aid in aligning moldable material held by design transfer device 400. View ports 420 may be used to vertically and/or horizontally align each section of moldable material 528 held by design transfer device 400. In this example, the sections of moldable material 528 are joined at seams 526 to form a continuous transferred design on surface 520.

Figure 10:
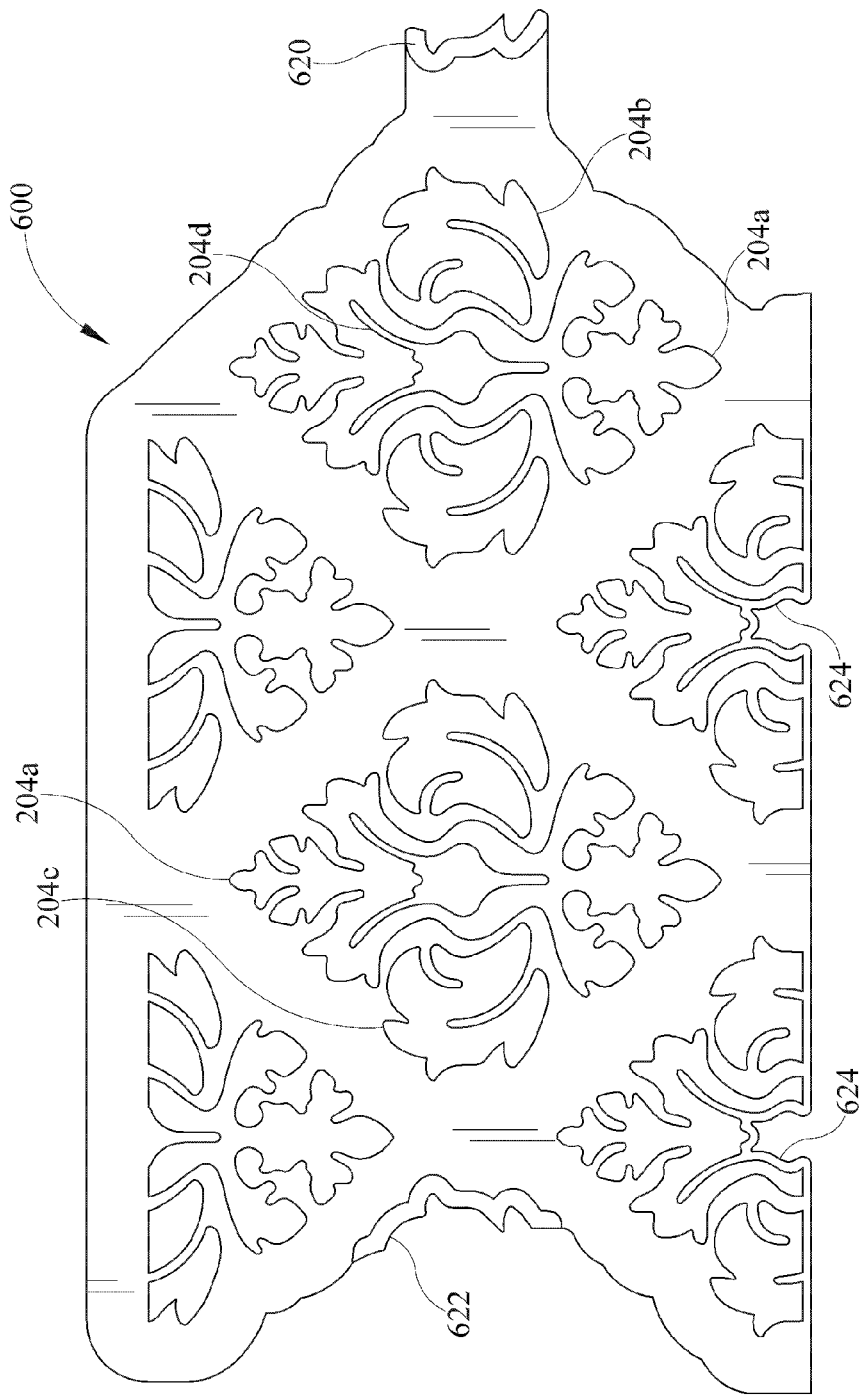
FIG. 10 shows a design transfer device of the present disclosure configured for aligning a design to be transferred with at least one feature on a surface configured to receive cut moldable material.

FIG. 10 shows design transfer device 600 configured for aligning a design to be transferred with at least one feature on a surface configured to receive cut moldable material. Design transfer device 600 has a plurality of spaced damask patterns of FIG. 2, each having continuous elastic cutting blades 204a, 204b, 204c, and 204d extending from first side surface 601 of planar wall 602. Proximate longitudinal ends of design transfer device 600, alignment features 620 and 622 extend from first side surface 601 of planar wall 602. Alignment features 620 and 622 are configured and disposed for aligning a continuous damask pattern on a surface configured to receive the cut moldable material. For example, a first design may be transferred to a surface with design transfer device 600 and a second design may be aligned with the first design. Alignment feature 620 is configured and disposed to be aligned with a raised feature, formed with cutting blade 204c, on the surface configured to receive the cut moldable material. Alignment feature 622 is configured and disposed to be aligned with a raised feature, formed with cutting blade 204b, on the surface configured to receive the cut moldable material. In at least one embodiment, a continuous design of substantially uniformly spaced damask patterns may be transferred to a surface with design transfer device 600 having alignment features 620 and/or 622. Notches, windows, or view ports 624, in planar wall 602, may also be provided with design transfer device 600 for aiding in alignment of a design to be transferred from transfer device 600 with a feature on the surface receiving the design.

Figure 11:
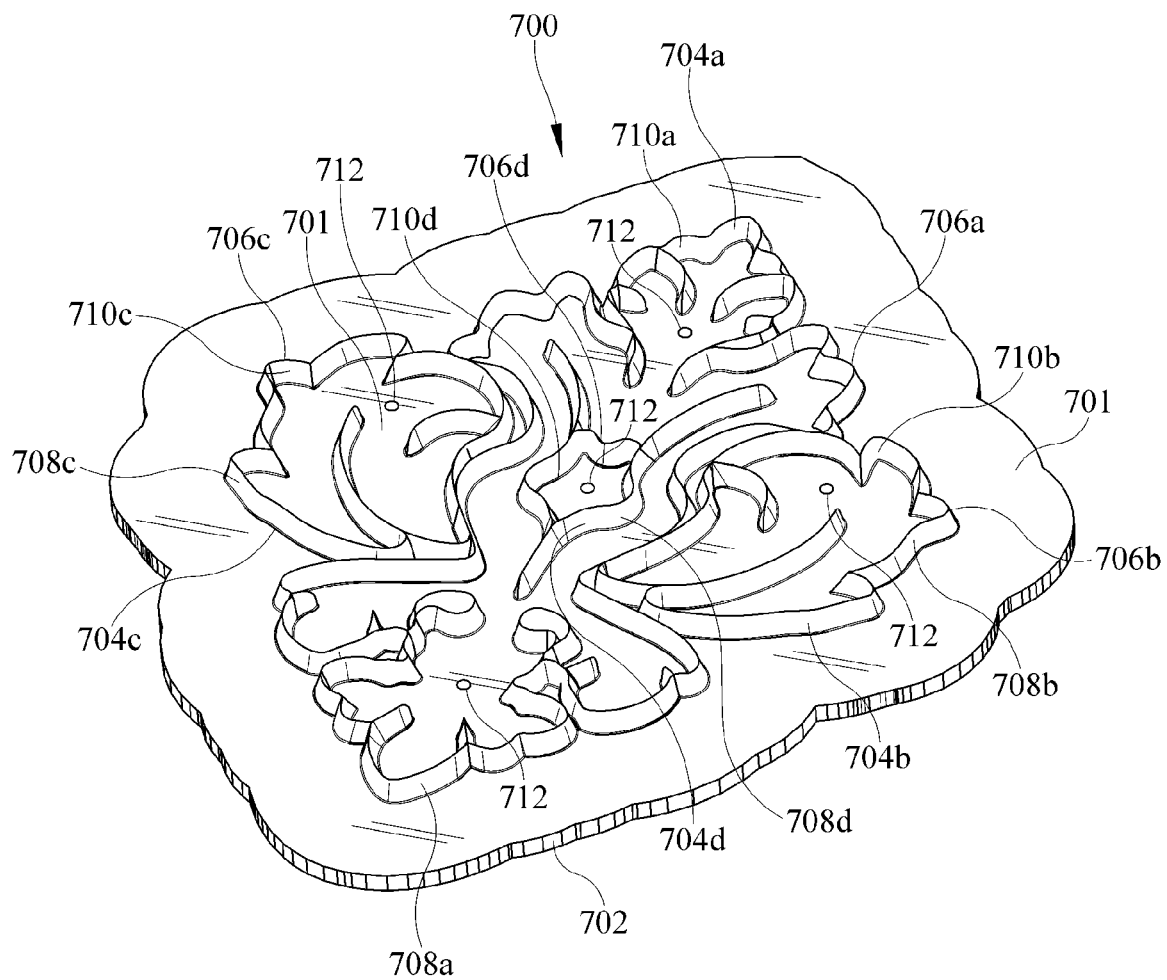
FIG. 11 is a perspective view of a design transfer device of the present disclosure having a plurality of vents.

FIG. 11 is a perspective view of design transfer device 700 of the present disclosure having a plurality of vents 712. Design transfer device 700 is configured to cut related designs from a moldable material to form a damask pattern. Design transfer device 700 has continuous elastic cutting blades 704a, 704b, 704c, and 704d extending from a first side surface 701 of elastic planar wall 702. Elastic cutting blade 704a has cutting edge 706a, outer side surface 708a, and inner side surface 710a. Elastic cutting blade 704b has cutting edge 706b, outer side surface 708b, and inner side surface 710b. Elastic cutting blade 704c has cutting edge 706c, outer side surface 708c, and inner side surface 710c. Elastic cutting blade 704d has cutting edge 706d, outer side surface 708d, and inner side surface 710d.

Design transfer device 700 comprises a plurality of vents 712 in elastic planar wall 702 and within an inner perimeter of the cutting edges. Vents 712 may have a diameter to allow the passage of air therethrough and may minimize or even prohibit the passage of moldable material therethrough. For example, vents 712 may be holes with a diameter up to approximately 1/16 inch or may be a plurality of perforations. In at least one embodiment, vents 712 are closed perforations that open upon being subjected to a desired air pressure. For example, when cutting, shaping, or embossing moldable material it may not be desirable for vents 712 to impart a shape on the moldable material. Vents 712 may provide for venting of air through the elastic planar wall 702 when pressing a sheet of moldable material against the cutting edges and thereby avoid trapping air between the moldable material and design transfer device 700. Additionally, vents 712 may provide for venting of air through the elastic planar wall 702 when transferring held molded material from design transfer device 700. This may greatly reduce, or even eliminate, any vacuum that may hinder the release of molded material from design transfer device 700 during transfer.

Figure 12:
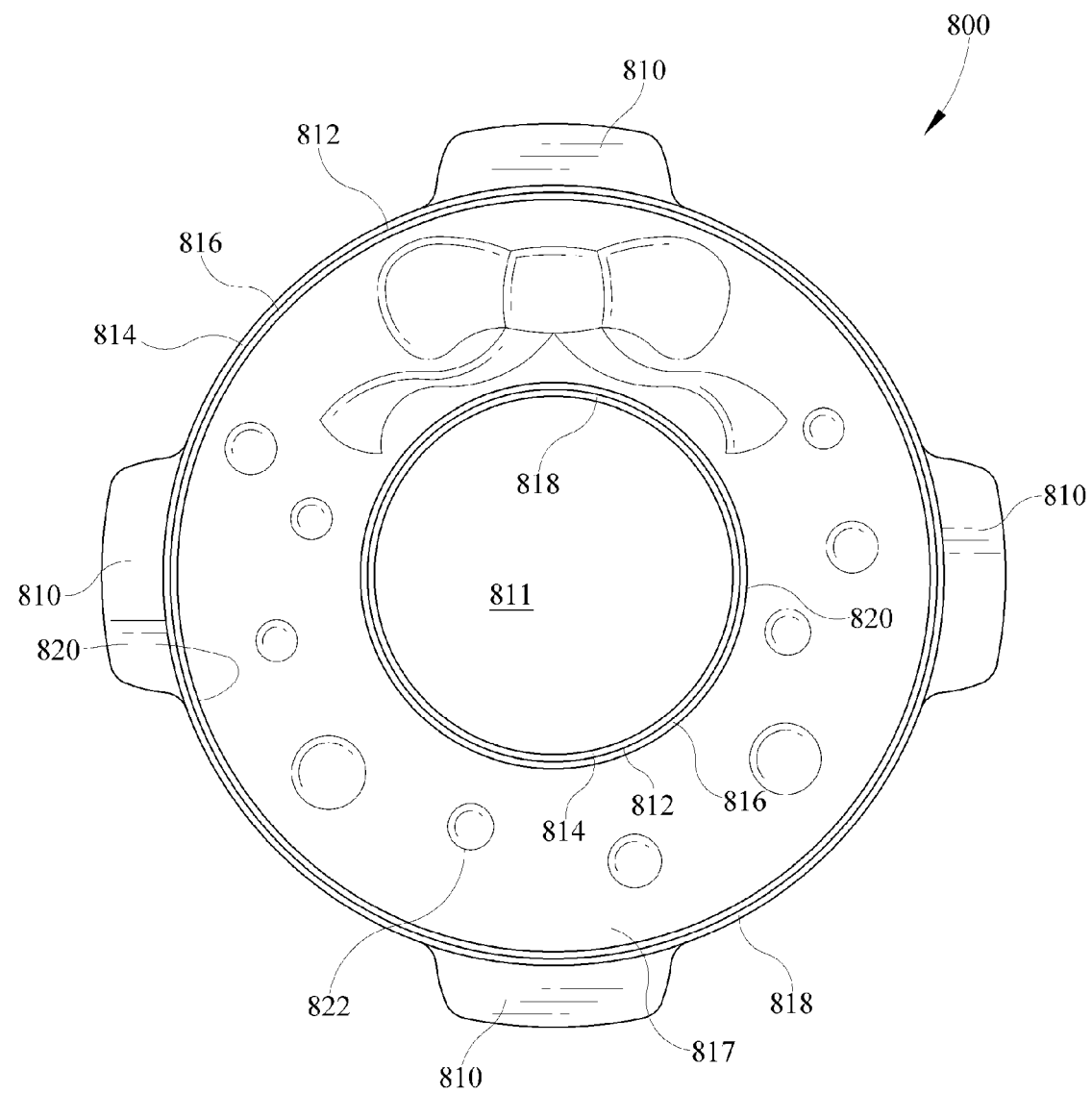
FIG. 12 is a front view of a design transfer device of the present disclosure being void of an elastic planar wall within a perimeter of an a second cutting blade.

FIG. 12 is a front view of design transfer device 800 of the present disclosure being void of an elastic planar wall within a perimeter of a second cutting blade. Design transfer device 800 is unitary and has two cutting blades 818 directly extending from elastic planar wall 817. Unitary design transfer device 800 may be configured to mold and cut moldable material wherein the cut molded material has at least two cuts. Design transfer device 800 has void 811 within an inner perimeter of outer cutting blade surface 814, of the inner cutting blade 818. Elastic planar wall 817 may comprise an embossed inner surface or embossments 822. Cutting blades 818 may be configured to cut moldable material and maintain a substantially consistent perimeter upon cutting.

Elastic cutting blade 818 may have a wedge shape, rounded shape, and/or other shape configured to cut moldable material. Each cutting blade 818 may comprise a continuous cutting edge 812, an inner cutting blade surface 816 extending from planar wall 817 to cutting edge 812, and an outer cutting blade surface 814 extending from cutting edge 812 to planar wall 817. Cutting edges 812 may be rounded or pointed. Inner cutting blade surfaces 816 and outer cutting blade surfaces 814 may be planar or curved. Inner cutting blade surfaces 816 and outer cutting blade surfaces 814 may each slope or curve from a cutting edge 812 toward planar wall 817 by a substantially equal amount.

Design transfer device 800 may further comprise demolding lips or tabs 810 extending directly from planar wall 817. Design transfer device 800 may have an elasticity sufficient to release molded material therefrom by hand stretching. For example, planar wall 817 may have an elasticity sufficient to release molded material therefrom by hand stretching wherein an embossed pattern 822 is stretched by an amount sufficient to release molded material from the embossed pattern. For example, a user may stretch a portion of design transfer device 800 by grasping and pulling outer demolding lip 810.

Figure 13:
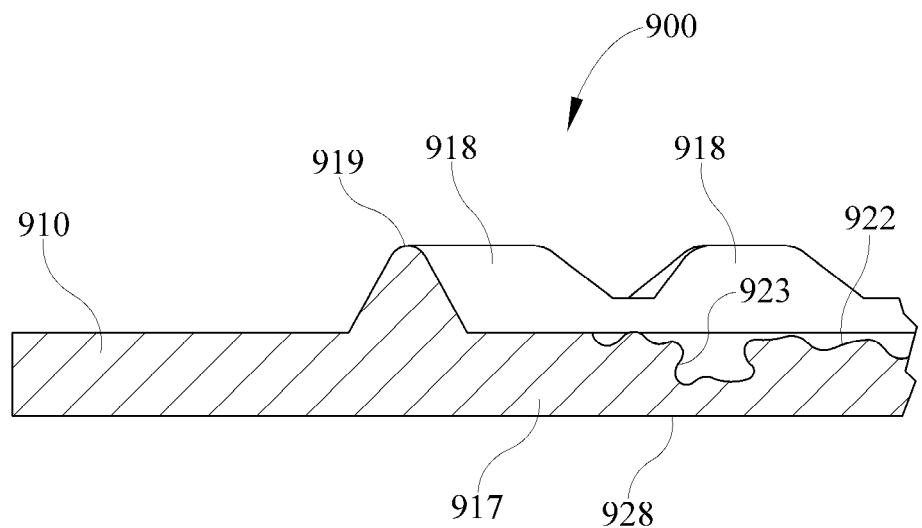
FIG. 13 is a cross-sectional view of a design transfer device of the present disclosure having a discontinuous cutting blade.

FIG. 13 shows a cross-sectional view of a portion of design transfer device 900 having a discontinuous cutting blade 918. Design transfer device 900 has an elastic planar wall 917 having an embossed first side surface 922 and a second side surface 928. Elastic cutting blade 918 is shown in the cross section and is unitary with elastic planar wall 917 and extends directly from first side surface 922. Cutting blade 918 has rounded cutting edge 919 and is discontinuous or interrupted. Elastic planar wall 917 may comprise an embossed inner surface 922 and outer surface 928. Embossed inner surface 922 may have one or more undercut embossed patterns 923. In this aspect, moldable material may be released from design transfer device 900 by stretching bottom wall 917 by an amount sufficient to release material molded in undercut 923. For example, a demolding lip 910 may extend around design transfer device 900 and may be pulled apart and thereby stretch embossed inner surface 922 and undercut 923 to release and transfer held molded material therefrom.

Figure 14:
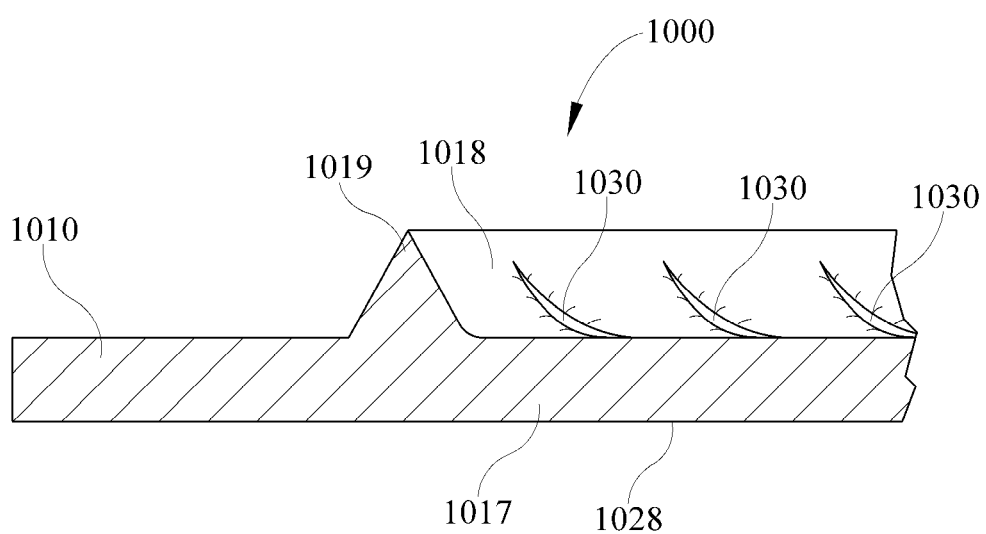
FIG. 14 is a cross-sectional view of a design transfer device of the present disclosure having an embossment on an inner side surface of a cutting blade.

FIG. 14 shows a cross-sectional view of a portion of design transfer device 1000 having an embossment 1030 on an inner side surface of a cutting blade 1018. Design transfer device 1000 has an elastic planar wall 1017 having an embossed first side surface and a second side surface 1028. Elastic cutting blade 1018 is shown in the cross section and is unitary with elastic planar wall 1017 and extends directly from the first side surface. Cutting blade 1018 has pointed cutting edge 1019 and is continuous. Elastic planar wall 1017 may comprise an embossed inner surface, for example embossments 1030 may extend from elastic planar wall 1017. As shown in this embodiment, an inner side surface of cutting blades 1018 may have embossments 1030. Design transfer device 1000 may also have a demolding lip 1010.

Figure 15:
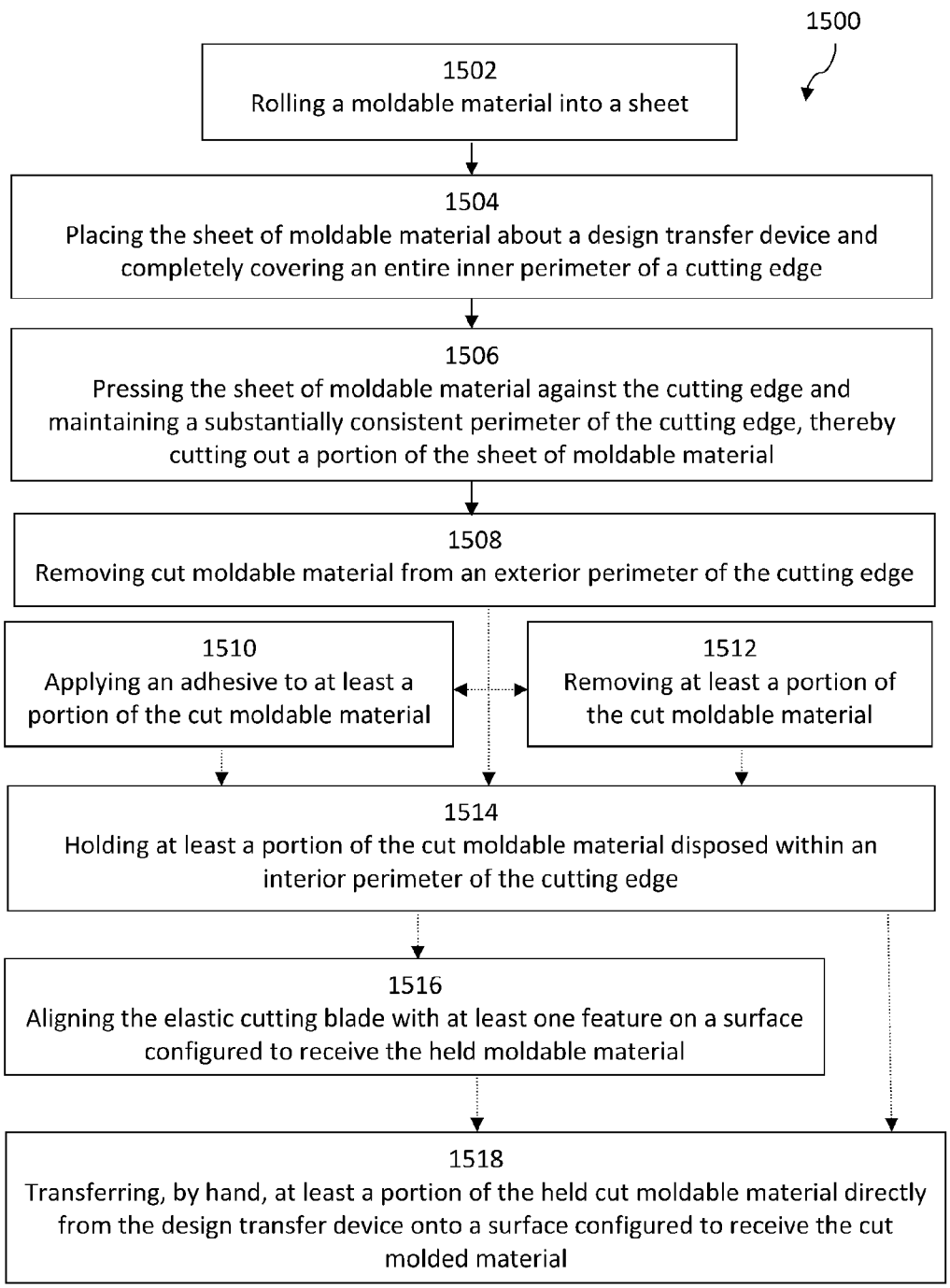
FIG. 15 schematically shows a method of transferring a design of moldable material onto a surface.

FIG. 15 schematically shows method 1500 for transferring a design of moldable material using the design transfer device disclosed herein. Step 1502 comprises rolling a moldable material into a sheet form. The sheet of moldable material is then placed about the design transfer device to completely cover an entire inner perimeter of a cutting edge extending from a surface of the design transfer device at step 1504. Step 1506 comprises pressing the sheet of moldable material against the cutting edge thereby cutting out a portion of the sheet of moldable material. In at least one embodiment, pressing the sheet of moldable material against the cutting edge comprises rolling the moldable material with a rolling pin. At step 1508, excess moldable material, exterior of a perimeter of the cutting edge, is removed.

Optionally, an adhesive may be applied to all, or only selected portions, of the cut moldable material at step 1510. For example, water may be used as an adhesive to increase tackiness between selected portions of the cut moldable material and a surface configured to receive the cut moldable material.

Optionally, selected portion(s) of the cut moldable material not to be transferred to surface configured to receive the cut moldable material may be removed from the design transfer device at step 1512. One or both steps 1510 and 1512 may be carried out to selectively transfer only portions of the cut moldable material from step 1508.

At step 1514 the cut moldable material disposed within an interior perimeter of the cutting edge is held for transfer. Optionally, the selected design of cut moldable material held within the interior perimeter of the cutting edge may be aligned with a feature on the surface configured to receive the held moldable material. This may be carried out in step 1516 by viewing, through a portion of an elastic planar wall, at least one feature on the surface configured to receive the held moldable material and aligning the elastic cutting blade with the viewed feature. In at least one embodiment, the cutting edge may be aligned with a raised feature on the surface configured to receive the cut moldable material without viewing through the planar wall.

The method concludes with transferring at least a portion of the held moldable material directly from the design transfer device onto the surface configured to receive the cut moldable material at step 1518. Transfer may be carried out by simply placing the moldable material held in the design transfer device onto the surface configured to receive the cut molded material. For example, transfer to a curved or non-planar surface may be carried out by curving the design transfer device to the configuration of the surface receiving the moldable material. Alternatively, transfer may be carried out by contacting a cut end of the moldable with the surface receiving the moldable material and progressing contact by moving the design transfer device.

In at least one embodiment, a method of making and transferring a design of moldable material onto a surface configured to receive cut molded material is provided. The method comprising the steps of: rolling a moldable material into a sheet; placing the sheet of moldable material onto a design transfer device and completely covering the entire inner perimeter of a cutting edge; pressing the sheet of moldable material against the cutting edge and maintaining a substantially consistent perimeter of the cutting edge thereby cutting out a portion of the sheet of moldable material; removing cut moldable material from an exterior perimeter of the cutting edge; holding at least a portion of the cut molded material disposed within an interior perimeter of the cutting edge; and transferring, by hand, at least a portion of the held molded material directly from the design transfer device onto the surface configured to receive the cut molded material.

The step of transferring may further comprise one or more of: changing the perimeter of the cutting blade; making the bottom wall non-planar; stretching the design transfer device in at least two directions parallel with the elastic planar wall; and bending the design transfer device about an axis perpendicular to the elastic planar wall and increasing the perimeter of the cutting blade.

One or both of the steps of pressing the sheet of moldable material against the cutting edge thereby cutting and transferring held molded material may comprise venting air through the elastic planar wall; the method may further comprising a step of applying an adhesive to at least a portion of the cut molded material prior to the step of transferring at least a portion of the held molded material. The method may further comprise a step of aligning the elastic cutting blade with at least one feature on the surface configured to receive the cut molded material, after the step of holding the cut molded material disposed within an interior perimeter of the cutting edge, and prior to the step of transferring at least a portion of the cut molded material. The method may further comprise a step of embossing a design onto the moldable material upon the step of pressing the sheet of moldable material against the cutting edge. Additionally, the step of pressing the sheet of moldable material against the cutting edge may comprise rolling the moldable material with a rolling pin.

The invention is illustrated by example in the drawing figures, and throughout the written description. It should be understood that numerous variations are possible while adhering to the inventive concept. Such variations are contemplated as being a part of the present disclosure.

The invention claimed is:

1. A design transfer device comprising:
   an elastic planar wall having a first side surface and a second side surface;
   an elastic cutting blade unitary with the elastic planar wall and extending directly from the first side surface of the elastic planar wall;
   the elastic cutting blade being configured to form a design, being capable of cutting a design from a moldable material and being configured to maintain a substantially consistent perimeter upon cutting;
   the elastic cutting blade having an inner side surface and an outer side surface with a cutting edge therebetween;
   the cutting edge being disposed at a substantially constant distance throughout its perimeter, from the first side surface of the elastic planar wall;
   the inner side surface of the elastic cutting blade extends non-perpendicularly from the first side surface of the elastic planar wall to the cutting edge, throughout the entire perimeter of the cutting blade; and
   the elastic planar wall and the elastic cutting blade are of a material allowing the design transfer device to be stretched or bent to release retained cut moldable material therefrom.

2. The design transfer device of claim 1 further comprising vent openings in the elastic planar wall and within an inner perimeter of the cutting edge.

3. The design transfer device of claim 1 wherein the cutting edge is continuous or discontinuous and pointed or rounded, throughout its perimeter.

4. The design transfer device of claim 1 configured to hold cut moldable material within the perimeter of the cutting blade and release by hand the cut moldable material onto a surface configured to receive the cut moldable material.

5. The design transfer device of claim 4 configured such that the perimeter of the cutting blade can be altered or such that the bottom wall can be made non-planar.

6. The design transfer device of claim 1 wherein the elastic planar wall has a portion extending outwardly beyond the outer side surface of the elastic cutting blade.

7. The design transfer device of claim 1 wherein the elastic planar wall comprises a translucent material, view port, or an alignment feature configured and disposed for aligning the elastic cutting blade with at least one feature on a surface configured to receive cut moldable material.

8. The design transfer device of claim 1 wherein the first side surface of the elastic planar wall comprises an embossment within the perimeter of the elastic cutting blade.

9. The design transfer device of claim 1 wherein the inner side surface of the cutting blade comprises an embossment.

10. The design transfer device of claim 1 further comprising a second elastic cutting blade unitary with the elastic planar wall and extending directly from the first side surface of the elastic planar wall;
    the second elastic cutting blade being configured to cut a second design from the moldable material;

the second elastic cutting blade having an inner side surface and an outer side surface with a second cutting edge therebetween;

the second cutting edge being disposed at a substantially constant distance throughout its perimeter, from the first side surface of the elastic planar wall; and the inner side surface of the second elastic cutting blade extends non-perpendicularly from the first side surface of the elastic planar wall to the second cutting edge, throughout the entire perimeter of the second cutting blade.

11. The design transfer device of claim 10 being void of the elastic planar wall within a perimeter of the inner side surface of the second cutting blade.

\* \* \* \* \*